July 28, 1970  M. V. GAEDDERT  3,521,687

CHOPPER FOR RESIDUE FROM COMBINES

Filed July 6, 1967

INVENTOR
Melvin V. Gaeddert

BY Schmidt, Johnson, Hovey,
Williams & Bradley
ATTORNEYS

United States Patent Office 3,521,687
Patented July 28, 1970

3,521,687
CHOPPER FOR RESIDUE FROM COMBINES
Melvin V. Gaeddert, Newton, Kans., assignor to Hesston Corporation, Inc., Hesston, Kans., a corporation of Kansas
Filed July 6, 1967, Ser. No. 651,405
Int. Cl. A01d 55/00
U.S. Cl. 146—117                    10 Claims

ABSTRACT OF THE DISCLOSURE

A rotatable chopper in a combine residue outlet including radial hammers freely swingable on shafts spaced around the axis of rotation. An elongated tube surrounds the shafts and the hammers extend through slots in the tube. A baffle overlies the chopper to guide the residue and angled deflector structure directs rebounding material into the chopper.

---

This invention relates to residue choppers and, more particularly, to a chopper for comminuting the residue flowing through a combine outlet after the grain has been threshed from the residue. Choppers of this general nature are conventionally utilized to spread the crop residue uniformly over the field to facilitate subsequent tilling operations and for better distribution of the nutrients to be derived from the residue.

Heretofore available choppers have been advantageously used in connection with small grain crops wherein the primary residue is straw. However, certain disadvantages have been encountered when the choppers are used in connection with the harvesting of crops such as mature corn. The residue of this crop includes the relatively bulky and heavy cobs and stalks. This material has an increased tendency to become caught or lodged between exposed parts of conventional choppers and also to rebound and bounce in the hood of the combine. Such rebounding can cause damage to the combine and is likely to prevent the material from flowing along the proper path through the chopper to obtain maximum comminution of the material.

Conventional straw choppers have utilized a plurality of tubular spacers between the respective hammers which are swingably mounted on a common external shaft. These spacers made fabrication and assembly of the choppers relatively difficult and expensive and increased the problems associated with disassembly of the choppers in the field.

It is, therefore, a primary object of this invention to provide a combine residue chopper of simplified construction, yet capable of efficient handling of relatively bulky residue.

Another important object of this invention is to provide a chopper which utilizes a unitary shroud both for mounting the hammers in spaced relationship on their respective shafts and for directing rebounding residue toward its proper path through the apparatus.

Still another very important object of the instant invention is the provision of novel deflectors strategically disposed with respect to the rotatable shroud for directing residue rebounding from the shroud and from the hammers toward a proper path of travel through the chopper for maximum comminution of the residue.

It is a further object of this invention to provide a combination deflector and spacer shroud for a residue chopper of simplified tubular construction, yet which is braced to resist the stresses associated with the centrifugal force of the rotating chopper hammers.

These and other important objects of the instant invention will be further explained or will become apparent from the following description, claims and drawing.

Figure 1:
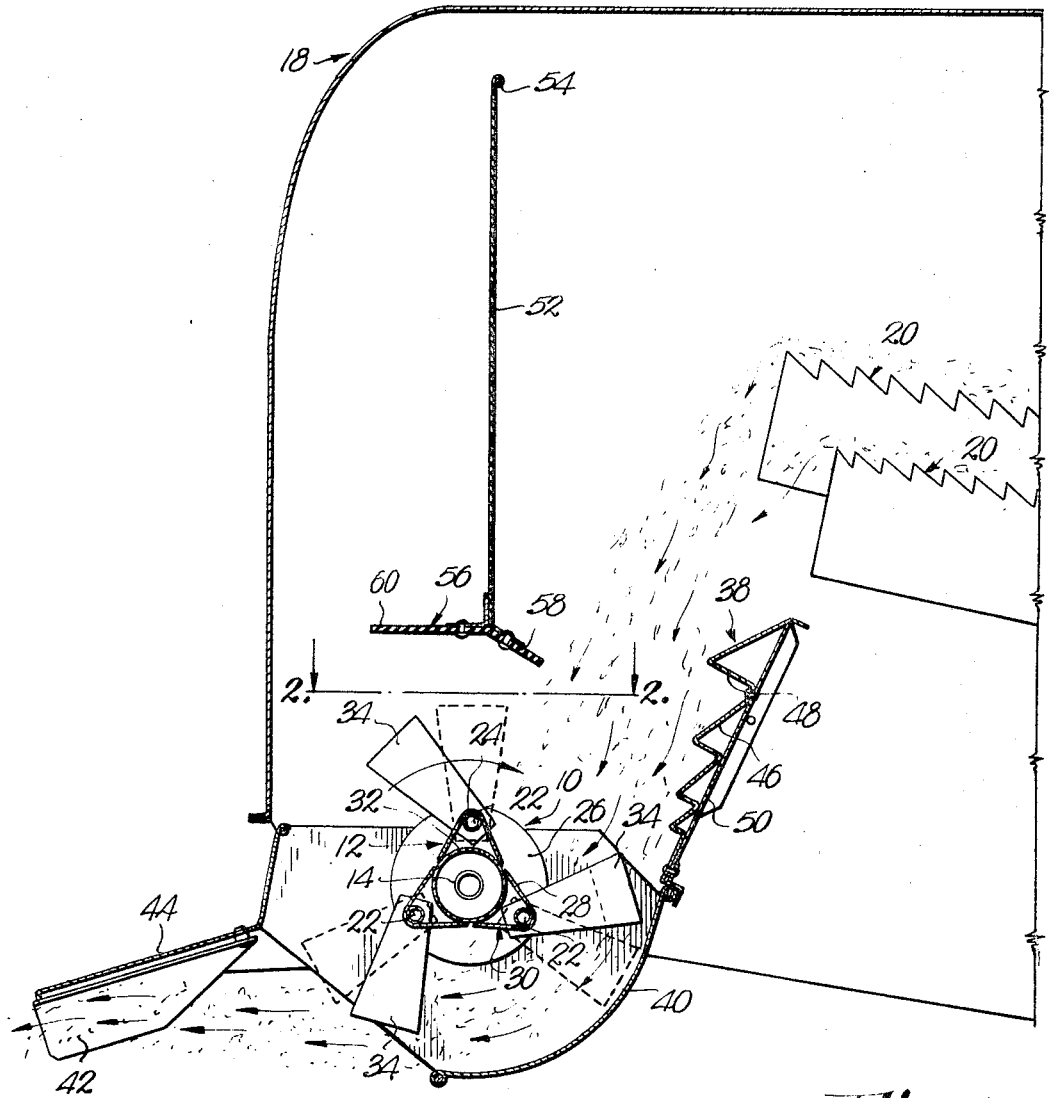
Figure 2:
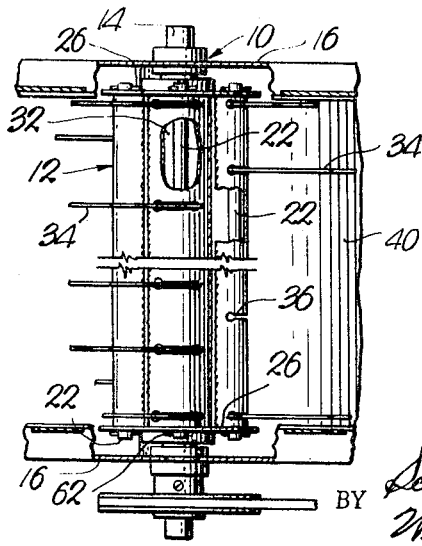

In the drawing:
FIG. 1 is a fragmentary, vertical, cross-sectional view through a combine equipped with a residue chopper embodying the principles of this invention; and
FIG. 2 is a view taken along line 2—2 of FIG. 1, parts being broken away to reveal details of construction.

A residue chopper embodying the principles of this invention is designated by the numeral 10 and includes a tubular member or shroud 12 mounted for rotation about its longitudinal axis upon an axle 14 journalled in the sides 16 of a combine hood 18. Chopper 10 extends across the residue outlet of hood 18 and is disposed to receive the residue emanating from the combine straw walkers broadly designated 20.

Tube 12 is transversely polygonal and in the embodiment illustrated comprises generally an equilateral triangle whereupon an elongated shaft 22 is received in each of the respective rounded corners 24 of tube 12. Shafts 22 extend longitudinally of chopper 10 and terminate in end plates 26. Thus, the plates 26 comprise support means for maintaining the shafts 22 in spaced relationship peripherally of tube 12 for rotation about axle 14.

In the construction of tube 12, the longitudinal marginal edges of wings 28 of the V-shaped tube sections 30 are secured as by welding or the like to the outer surface of an elongated, transversely circular tube member 32 disposed in concentric relationship to axle 14 and extending substantially the full length of chopper 10 outwardly beyond the respective end plates 26. Thus, member 32 serves to brace tube 12 in a manner to prevent collapse or expansion of tube 12. This is extremely important inasmuch as the chopper hammers 34 are swingably mounted in mutually spaced relationship on the respective shafts 22, each V-shaped section 30 being provided with slots 36 to receive the hammers extending outwardly therethrough and for holding the hammers in spaced relationship along their shafts. The tube sections 30 not only space the hammers properly along the shafts, but support the otherwise unsupported length of the respective shafts 22 in the nature of a girth binding the shafts together to equalize the stresses of the unit and to prevent outward bowing of the respective shafts under the influence of centrifugal force during operation of the chopper.

The polygonal faces of tube 12 further serve to prevent any bulky material, such as pieces of corncobs, cornstalks or the like, from becoming wedged or lodged between the hammer supporting shafts and the axle of the chopper. Further, these faces serve to deflect or rebound material which fails to pass through the proper portion of the chopper for maximum comminution of the residue material. Thus, that material which would tend to pass through the chopper near the axis of rotation thereof would not receive the most effective treatment by the chopper. Such material is deflected upwardly as it comes into contact with the polygonal face of tube 12.

A series of sawtooth, angle deflectors 38 are disposed to receive rebounding material and to direct it down into the chopper for a path of travel generally along the concave housing 40 whereby the material is contacted most effectively by the hammers 34 for the maximum comminution before the material passes out through the open rear end of the chopper. Deflector fins 42 carried by a spreader board 44 may thereupon distribute the comminuted material over the surface area of the field as may be required.

It should be pointed out that the uppermost angled portions 46 of the respective undulations of deflector 38 do not hamper gravitational movement of the residue material downwardly into chopper 10. On the other hand, the faces 48 which join with the inclined surfaces 46 extend substantially normal to the inclined mounting plate 50 in disposition to receive the rebounding material and to direct it downwardly toward the proximity of the downwardly moving hammers 34 and concave housing 40.

The relatively bulky and heavy material to be handled by chopper 10 has a tendency to be carried upwardly with hammers 34 and back into the machine as chopper 10 rotates in the direction of the arrow in FIG. 1. Further, such bulky material may rebound from deflector 38 in a manner which could cause damage to hood 18 of the combine. In any event, it is deemed desirable, especially with bulky material such as the residue from a corn crop or the like, to direct the residue precisely toward its proper path of travel through the chopper. To this end, a flexible baffle 52 is hingedly mounted at 54 in disposition to receive the crop moving rearwardly of the combine to absorb the energy thereof and to direct the residue toward the downwardly moving portion of chopper 10. Accordingly, it is important that baffle 52 be disposed in line with or forwardly of the axis of rotation of chopper 10 about axle 14.

Baffle 52 may comprise a rubberized sheet or curtain and it may freely swing for better absorption of the energy of objects striking the baffle. The lowermost terminus of baffle 52 includes a generally horizontal apron 56 having a downwardly and forwardly inclined section 58 spaced forwardly of axle 14 as illustrated in FIG. 1 of the drawing. Thus, section 58 serves additionally to direct the gravitating material to the downward portion of chopper 10 whereas the lowermost surface of the rearwardly projecting portion 60 of apron 56 serves to guide any material carried by the upwardly moving portion of chopper 10 back toward its proper path of travel through the chopper as has been previously described. Thus, the apron 56 cooperates with the moving polygonal faces of tube 12, whereupon material which has not properly traversed chopper 10 is deflected first from the faces of tube 12 and then from apron 56 toward the downwardly moving portion of chopper 10. Not to be overlooked is the fact that deflector 38 also cooperates with baffle 52 and apron 56, as well as the polygonal faces of tube 12 for directing the rebounding material into its proper path of travel through the chopper.

The simplified construction wherein tube 12 serves additionally as spacer means for maintaining the hammers 34 along their respective shafts 22 permit ready disassembly of the unit in the field or otherwise to allow repair or replacement of damaged hammers. It may be readily seen that the fastening means 62 disposed at the ends of the respective shafts 22, externally of the plates 26, may be quickly and easily removed whereupon the shafts may be individually removed as desired for replacement of a new hammer 34. There is virtually no hazard for lost parts as was heretofore experienced with conventional choppers utilizing a plurality of individual spacers mounted on the shafts between the respective hammers. This hazard was especially present when disassembly was required in the field.

Having thus described the invention, what is claimed as new and desired to be secured by Letters Patent is:

1. In a combine having a hollow, residue-receiving hood provided with a downwardly facing residue outlet, and a residue chopper rotatably mounted in said outlet, said chopper having a downwardly rotating first portion and an upwardly rotating second portion, the improvement comprising structure for controlling the flow of said residue into said first portion, including:

baffle means in the hood above the chopper within the path of travel of residue emanating from the combine and disposed to change the direction of movement of the residue into gravitational flow toward and into said first portion of the chopper and away from said second portion thereof, said baffle means comprising an upright panel in substantial vertical alignment with the axis of rotation of the chopper and provided with a lower terminus coextensive in length with and in spaced parallelism to said axis.

2. The invention of claim 1, wherein said panel is flexible for absorbing the moving energy of said residue.

3. The invention of claim 1, said baffle means including an apron extending along said terminus and disposed within the path of gravitating residue for preventing flow of the latter between the chopper and said terminus.

4. The invention of claim 1, and means for controlling the residue which tends to revolve with the chopper, including an apron extending along said terminus in spaced, overlying relationship to both of said portions of the chopper.

5. The invention of claim 1, and means extending along said first portion of the chopper within the hood in the path of travel of residue rebounding from said first portion and having a plurality of deflectors angled to redirect the rebounding residue toward said first portion of the chopper.

6. The invention of claim 5, and means for controlling the residue which tends to revolve with the chopper, including an apron extending along said terminus in spaced overlying relationship to both of said portions of the chopper, a part of said apron being disposed within the path of gravitating residue for preventing flow of the latter between the chopper and said terminus.

7. In a combine having a hollow, residue-receiving hood provided with a residue outlet, and a rotatable residue chopper in said outlet, the improvement comprising structure for controlling the feeding of the residue to the chopper, said structure including:

deflector means extending along the chopper within the hood in the path of travel of residue rebounding from said chopper and angled to redirect the rebounding residue toward the chopper, said chopper having a plurality of swingable hammers extending radially outwardly beyond its axis of rotation, and means adjacent the swinging axes of the hammers for projecting the residue toward said deflector means.

8. The invention of claim 7, said chopper having a shroud about its axis of rotation with the hammers extending therethrough for reducing the amount of residue carried around the chopper therewith.

9. In a combine having a hollow, residue-receiving hood provided with a residue outlet, and a rotatable residue chopper in said outlet, the improvement comprising structure for controlling the feeding of the residue to the chopper, said structure including:

deflector means extending along the chopper within the hood in the path of travel of residue rebounding from said chopper and angled to redirect the rebounding residue toward the chopper, said deflector means having a plurality of deflector faces angled to redirect the rebounding residue toward the chopper.

10. In a combine having a hollow, residue-receiving hood provided with a downwardly facing residue outlet, and a residue chopper rotatably mounted in said outlet, said chopper having a downwardly rotating first portion and an upwardly rotating second portion, the improvement comprising structure for controlling the flow of said residue into said first portion, including:

baffle means in the hood above the chopper within the path of travel of residue emanating from the combine and disposed to change the direction of movement of the residue into gravitational flow toward and into said first portion of the chopper and away from said second portion theerof, said baffle means comprising an upright panel in substantial vertical alignment with but forwardly of the axis of rotation of the chopper and provided with a lower terminus disposed above the chopper.

References Cited
UNITED STATES PATENTS

| | | | |
|---|---|---|---|
| 2,068,450 | 1/1937 | Eberly | 146—123 X |
| 2,359,995 | 10/1944 | Korum | 146—107 X |
| 2,490,564 | 12/1949 | Vincent | 146—123 X |
| 2,554,669 | 5/1951 | Elofson | 146—123 X |
| 3,103,241 | 9/1963 | Weigel | 146—123 X |

JAMES M. MEISTER, Primary Examiner